United States Patent
Gaiser et al.

(10) Patent No.: US 9,278,299 B2
(45) Date of Patent: Mar. 8, 2016

(54) FILTER ELEMENT INCLUDING A FILTER PRESS PLATE

(75) Inventors: Richard M. Gaiser, Pendleton, NY (US); Hansjoerg Duer, Schwarzach (AT)

(73) Assignee: Sefar AG, Heiden (CH)

( * ) Notice: Subject to any disclaimer, the term of this patent is extended or adjusted under 35 U.S.C. 154(b) by 842 days.

(21) Appl. No.: 12/515,239

(22) PCT Filed: Aug. 30, 2007

(86) PCT No.: PCT/EP2007/007586
§ 371 (c)(1),
(2), (4) Date: May 15, 2009

(87) PCT Pub. No.: WO2008/058582
PCT Pub. Date: May 22, 2008

(65) Prior Publication Data
US 2010/0032383 A1    Feb. 11, 2010

(30) Foreign Application Priority Data
Nov. 16, 2006   (EP) ..................................... 06023832

(51) Int. Cl.
*B01D 25/21*   (2006.01)
*B01D 25/00*   (2006.01)

(52) U.S. Cl.
CPC .................................. *B01D 25/001* (2013.01)

(58) Field of Classification Search
CPC .................................................... B01D 25/176
USPC .......................................... 210/232, 233, 499
See application file for complete search history.

(56) References Cited

U.S. PATENT DOCUMENTS

| | | | | |
|---|---|---|---|---|
| 4,994,181 A | * | 2/1991 | Mullaney, Jr. | 210/232 |
| 5,310,482 A | * | 5/1994 | Sather | 210/485 |
| 5,851,387 A | * | 12/1998 | Neumann | 210/229 |
| 6,007,717 A | * | 12/1999 | Hayhurst et al. | 210/230 |
| 6,971,526 B2 | * | 12/2005 | Hibble | 210/499 |
| 2005/0016916 A1 | * | 1/2005 | Zermani et al. | 210/498 |

FOREIGN PATENT DOCUMENTS

| | | | | |
|---|---|---|---|---|
| DE | 4432004 | * | 3/1996 | ........... B01D 33/067 |
| DE | 4432004 A1 | | 3/1996 | |
| EP | 1264627 A | | 12/2002 | |
| GB | 2088231 A | | 6/1982 | |
| WO | 9318838 A | | 9/1993 | |

OTHER PUBLICATIONS

Daniel Hilt; "International Search Report"; PCT/EP2007/007586; Jan. 2, 2008.

* cited by examiner

*Primary Examiner* — Tony G Soohoo
*Assistant Examiner* — Peter Keyworth
(74) *Attorney, Agent, or Firm* — Studebaker & Brackett PC

(57) ABSTRACT

A filter element with a filter medium and at least one retainer, to which the filter medium is fixed. The retainer comprises a retainer base body and a retainer attachment. The filter medium is arranged between the retainer base body and the retainer attachment at least in sections, and at least one profile element is formed on the retainer base body and/or on the retainer attachment to allow form-fitting and/or force-fitting retention of the filter medium there between.

19 Claims, 6 Drawing Sheets

FILTER ELEMENT INCLUDING A FILTER PRESS PLATE

BACKGROUND

1. Technical Field

The invention relates to a filter element, particularly a filter press plate. Such a filter element is designed with a filter medium, particularly a filter fabric, and at least one retainer, to which the filter medium is fixed.

2. Description of the Related Art

Filter press plates for plate-type filter presses are known. Such plates generally have a centrally disposed passage opening which allows the liquid to be filtered to pass through. A plurality of filter press plates are arranged and pressed one beside the other in the plate-type filter press in such a way that the passage openings are aligned and form a channel, via which the liquid to be filtered is fed into the filter.

In order to fix the filter medium in the region of the passage opening it is known that the filter medium can be sewn to parts of a filter passage tube. U.S. Pat. No. 4,053,416 and U.S. Pat. No. 6,971,526 B2 for example teach this point. It is further known that the filter medium can be joined by material engagement, particularly by induction welding, to the passage tube, as follows for example from U.S. Pat. No. 5,958,173, U.S. Pat. No. 6,932,906 B2, U.S. Pat. No. 4,765,859 and U.S. Pat. No. 4,931,178. U.S. Pat. No. 6,007,717 also discloses the deformation of a flange element for the purpose of holding the filter cloth.

SUMMARY

To overcome the problems of the conventional techniques described above, the present invention provides a filter element in which the filter medium is simply and reliably fixed to a retainer.

The retainer of the filter element according to the present invention comprises a retainer base body and a retainer attachment, the filter medium is arranged between the retainer base body and the retainer attachment at least in sections and at least one profile element is configured on the retainer base body and/or on the retainer attachment for form-fitting, i.e. positive fitting, and/or force-fitting, i.e. friction locked, retention of the filter medium.

The retainer is formed in multiple parts and the filter medium is fixed in a form-fitting and/or force-fitting manner between the parts of the retainer. According to an embodiment of the present invention, the filter element can be configured so that the form-fitting and/or force-fitting connection for retaining the filter medium is produced when the retainer base body is joined to the retainer attachment. In comparison with a sewn or welded arrangement this idea according to an embodiment of the present invention allows the connection between the filter medium and the retainer to be produced with particularly limited use of tools, meaning that it is particularly highly economical. In particular it can be carried out regardless of the material and the thickness of the filter medium. At the same time the present invention allows the filter medium to be retained on the retainer in a particularly reliable and durable way, as the retainer is arranged in the region of the form-fitting and/or force-fitting connection on the two flat sides of the filter medium and thus protects the form-fitting and/or force-fitting connection. In order to achieve a particularly secure form-fitting and/or force-fitting connection at least one profile element is provided according to the present invention which is in contact with the filter medium.

The filter medium according to an embodiment of the present invention can be a filter fabric. Additionally or alternatively, however, a filter membrane, a filter fleece or another type of filter cloth can e.g. also be provided.

A plurality of profile elements are preferably provided according to an embodiment of the present invention which can be identical but also different in their dimensions and/or their operating principle. The profile elements can be arranged either on the retainer base body or on the retainer attachment or also on both retainer parts. The retainer base body and the retainer attachment fittingly have a flat configuration in the region of the filter medium placed between them.

A reliable form-fitting connection between the filter medium and the retainer can be achieved by configuring the profile element as a retaining mandrel which penetrates the filter medium, in particular piercing it. In order to ensure a tight and durable retention the diameter of the retaining mandrel may preferably be smaller than the mesh size of the filter fabric. It is further advantageous for the retaining mandrel to run into a point and in particular to be conical. This facilitates the piercing of the filter medium and hence the assembly. The retaining mandrel fittingly has such dimensions that it penetrates the filter cloth but does not damage it. In particular the dimensions of the mandrel can be such that it widens the mesh of the filter fabric which it penetrates. It can also be provided that the retaining mandrel projects through a recess in the filter medium previously incorporated for example by laser cutting. In this case, it is also conceivable to use mandrels that do not run into a point.

According to the present invention the profile element may preferably be configured as a profiled protrusion which protrudes on the retainer base body or on the retainer attachment and for a corresponding depression and/or corresponding counterpart to be provided on the retainer attachment or on the retainer base body, into which the profile element engages and/or projects. This further increases the reliability of the retention. The profile element can be in a barbed hook like form. The corresponding counterpart can also be arranged protruding on the retainer attachment or on the retainer base body, respectively.

It may be further preferred that the filter medium to be bent at least once in the region of the retainer. This also allows the reliability of the retention of the filter medium on the retainer to be improved. The filter medium is preferably bent in the cross-section by an angle of 90° or more. The filter medium can be bent in particular on the profile element. In this case it is advantageous to select the dimensions of the profile element so that the filter element wraps round the profile element and is not pierced by it. In particular the dimensions of the profile element can be greater than the mesh size of the filter fabric for this purpose.

According to an embodiment of the present invention a plurality of profile elements of differing design and functionality can also be configured on the retainer. For example it is possible to arrange on the same container both comparatively small retaining mandrels which penetrate the filter element and also profile elements with larger dimensions around which the filter medium is guided. A profile element can further have a dual functionality, whereby it is formed in one region so that it pierces the filter element and in another region is formed so that it bends the filter element. For example, the filter element can be pierced in the pointed region of a mandrel by this mandrel and be bent in the base region.

In addition, according to the present invention, the retainer base body and/or the retainer attachment have an annular configuration. This is advantageous particularly if the filter medium is arranged in the region of a passage opening, in particular in the region of a filter passage tube, of a filter press plate.

It may be further preferred, according to the present invention, for at least one profile element to have means for joining the retainer base body to the retainer attachment. In this case the profile element has a dual function. On the one hand it is used to hold the filter medium on the retainer and on the other hand to hold together the individual parts of the retainer among each other. For example a snap element can be provided on the end face of the profile element which forms a snap lock between the retainer base body and the retainer attachment. If a plurality of profile elements are provided one or more of these elements can comprise means for connecting the retainer base body to the retainer attachment. In principle the connection produced by the connecting means can be a form-fitting, force-fitting and/or a material-locking connection whereby a material-locking or a form-fitting connection is particularly preferred.

It may be further advantageous for the retainer base body and the retainer attachment to be materially engaged, particularly welded and/or stuck together, via at least one profile element particularly a retaining mandrel. For example at least one retaining mandrel can protrude on the retainer base body which penetrates the filter medium and is welded or stuck on its side facing away from the retainer base body to the retainer attachment. Additionally or alternatively at least one retaining mandrel can be provided on the retainer attachment which penetrates the filter fabric and is connected on its end facing away from the retainer attachment in a material-locking way with the retainer base body.

Such a filter element can be produced for example in that firstly the filter medium is placed between the retainer base body and the retainer attachment, wherein the at least one profile element preferably penetrates the filter medium at least partially and subsequently the material-locking connection is produced between the retainer base body and the retainer attachment on the profile element.

It may be further advantageous according to the present invention for the filter medium to be connected in a material-locking way to the retainer, in particular being welded and/or stuck together. According to this embodiment in addition to the form-fitting and/or force-fitting connection through the profile element a material-locking connection is also produced between the filter medium and the retainer, thereby ensuring that the filter medium is fixed to the retainer in a particularly reliable way.

In principle the filter element can be used with different types of filters. For example the filter element can be provided for a band filter, a revolving filter and/or a leaf filter. The filter element is advantageously formed, however, as a filter press plate. The retainer can thereby be provided in particular for fixing the filter medium in the region of a filter passage opening of the filter press plate. The retainer is preferably configured on a filter passage tube of the filter press plate.

It may be further advantageous in case of use as a filter press plate for the filter medium to be provided with at least one hole and for the filter medium to be fixed in the region of the hole to the retainer. In particular the hole can be aligned with the filter passage opening and/or the filter passage tube.

The hole is fittingly produced by a laser cutting process or by an ultrasound cutting process. A good edge quality can be highly significant for a simple and reliable connection.

It may be further advantageous in case of use as a filter band for band filters for the retainer to be elongated and/or to extend along at least one edge of the filter medium. The retainer can preferably be formed as part of a band closure for the filter band and/or a lateral guide element for the filter band.

The invention also comprises a method for filtering a liquid wherein the liquid is fed through a filter medium of a filter element according to the present invention.

According to the invention the retainer can be in divided into parts. The force-fitting connection between the retainer and the filter medium can be produced for example by winding friction and/or mechanical gripping and/or clamping.

BRIEF DESCRIPTION OF DRAWINGS

The invention is explained in greater detail below by reference to preferred embodiments which are shown in the drawings in which.

DETAILED DESCRIPTION

Hereinafter, with reference to the drawings, the invention will be made apparent by describing exemplary embodiments. Elements working in the same way have the same reference numerals in the drawings.

Figure 1:
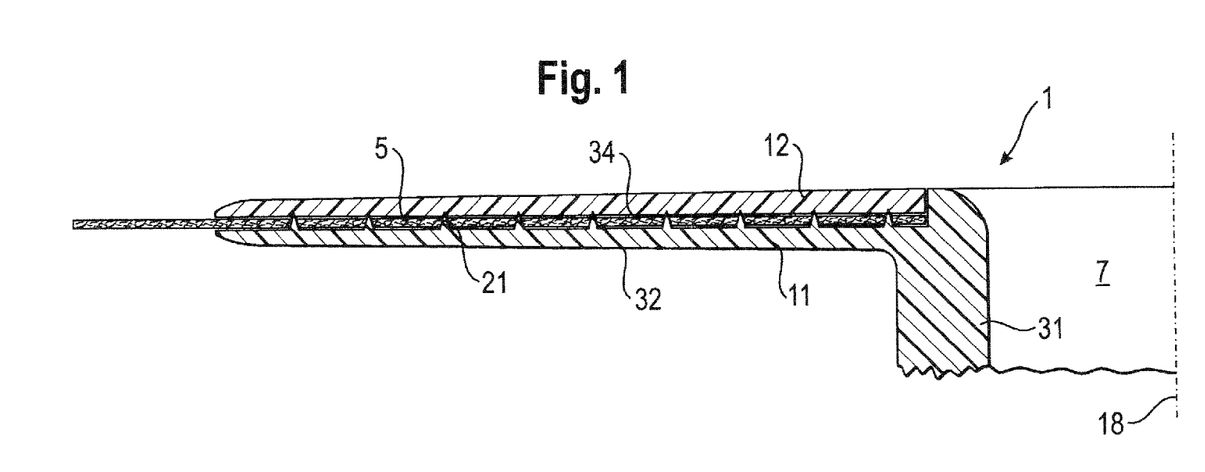
FIG. 1 shows a sectional partial view of a filter element according to an embodiment of the present invention.

A first embodiment of a filter element according to the present invention is shown as a cut-out in FIG. 1. The filter element is designed as a filter press plate for a plate filter. The filter element comprises a retainer 1 which is provided for fixing a filter medium 5 in the form of a filter cloth. The retainer 1 is arranged in the region of a passage opening 7 for the liquid to be filtered and annularly surrounds the longitudinal axis 18 of the passage opening 7.

The retainer 1 has two parts and comprises a retainer base body 11 as well as a retainer attachment 12. The retainer base body 11 in turn comprises a tube section 31 and a flange section 32. The tube section 31 forms a filter passage tube in which the passage opening 7 for the medium to be filtered is formed. The flange section 32 is provided at the end face of the tube section 31 and is configured like an annular disc. The retainer attachment 12 is also configured like an annular disc. The annular disc like retainer attachment 12 and the annular disc like flange section 32 of the retainer base body 11 are arranged with aligned opposing flat sides. An annular slot 34 is formed in the region of the flange section 32 between the retainer base body 11 and the retainer attachment 12. The filter medium 5 is received in this slot.

On the flange section 32 of the retainer base body 11 there protrude a plurality of retaining mandrels 21 which extend towards the opposing retainer attachment 12. These penetrate the filter medium 5 formed as a fabric without damaging it, which can be associated in particular with a widening of the meshes of the filter medium 5. A form-fitting connection between the filter medium 5 and the retaining mandrels 21 and hence the flange section 32 of the retainer base body 11 is thereby created.

The retainer attachment 12 formed as a fixing ring is arranged at the tips of the retaining mandrels 21 and fixes the filter medium 5 to the retaining mandrels 21 and thus to the retainer base body 11. The retainer attachment 12 is fusion bonded, that is to say welded, at the tips of the retaining mandrels 21, so that the retainer attachment 12 is fixed to the retaining mandrels 21 and thus to the retainer base body 11. In order to facilitate the fusion bonding the retainer attachment 12 and the retaining mandrels 21, as well as the flange section 32, are produced from a thermoplastic material, in particular a thermoplastic elastomer.

In producing the filter element it is suitable for the filter medium 5 to firstly be placed on the retaining mandrels 21 and for the retainer attachment 12 and the retainer base body 11 to then be fusion bonded via the retaining mandrels 21.

Figure 2:
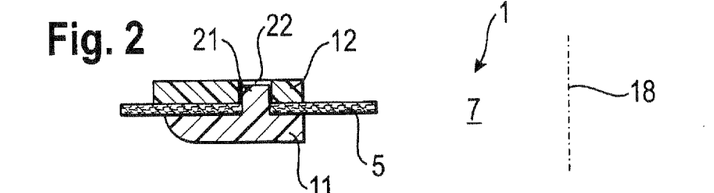
FIG. 2 shows a sectional partial view of the filter element according to an alternative embodiment of the present invention.

A further embodiment of a filter element according to the present invention in the region of the retainer 1 is shown in FIG. 2. As in the case of the embodiment of FIG. 1, a retaining mandrel 21 is provided on the retainer base body 11 and pierces the filter medium 5, thus producing a form-fitting connection between the filter medium 5 and the retainer 1. In the case of the embodiment of FIG. 2, a recess 22 is additionally provided in the retainer attachment 12, which recess corresponds to the retaining mandrel 21 and in which engages the retaining mandrel 21.

Figure 7:
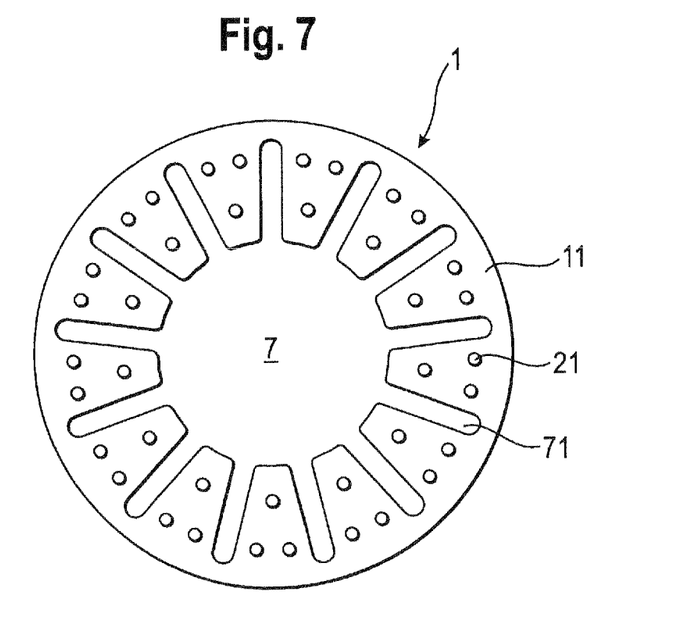
FIG. 7 shows a top view of the retainer base body of the embodiment of FIG. 2.

The retainer 1 of FIG. 2 which is only shown in sections in FIG. 2 is shown in FIG. 7 in a top view, wherein for the purpose of clarity the retainer attachment 12 and the filter medium 5 are not shown in FIG. 7. As can be seen from FIG. 7, a plurality of retaining mandrels 21 are arranged on the annular retainer base body 11 around the passage opening 7. Furthermore, a plurality of radial passage channels 71 are provided on the retainer base body 11 for the radial passage of the liquid to be filtered.

Figure 3:
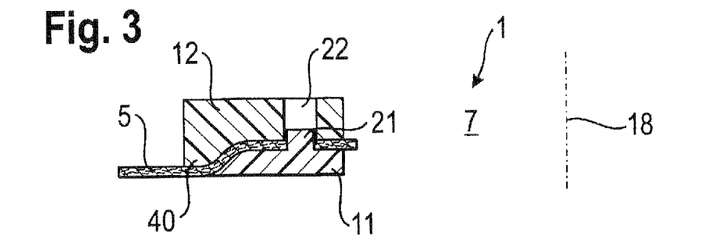
FIG. 3 shows a sectional partial view of the filter element according to an alternative embodiment of the present invention.

A further embodiment of a filter element according to the present invention with a retainer 1 is shown in FIG. 3. Like the retainer 1 of FIG. 2, the retainer 1 of FIG. 3 comprises a retaining mandrel 21 which projects into a corresponding recess 22 in the retainer attachment 12 and which penetrates the filter medium 5. In addition a profiled protrusion 40 is provided in the embodiment of FIG. 3 around which the filter medium 5 is guided and on which an additional force-fitting connection is formed between the retainer base body 11 and the retainer attachment 12.

Figure 4:
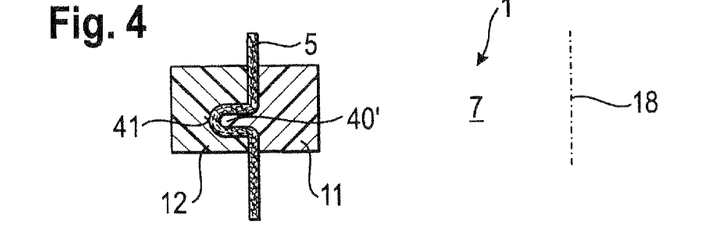
FIG. 4 shows a sectional partial view of the filter element according to an alternative embodiment of the present invention.

In the embodiment of FIG. 4, a profile element in the form of a profiled protrusion 40' is provided on the retainer base body 11, said profile element projecting into a corresponding recess 41 on the retainer attachment 12. The filter medium 5 is guided around the profiled protrusion 40' in the region of the recess 41 and a force-fitting connection to the filter medium 5 is thereby produced.

Figure 5:
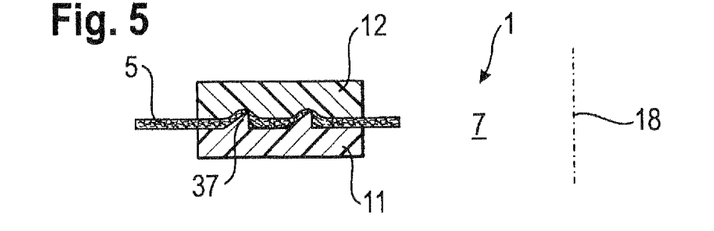
FIG. 5 shows a sectional partial view of the filter element according to an alternative embodiment of the present invention.

In the embodiment of FIG. 5 pointed claws 37 are provided on the retainer base body 11. The claws 37 pierce the filter medium 5 in the area of their tips. The filter medium 5 is guided around the claws 37 in the broader base area of the claws 37.

Figure 6:
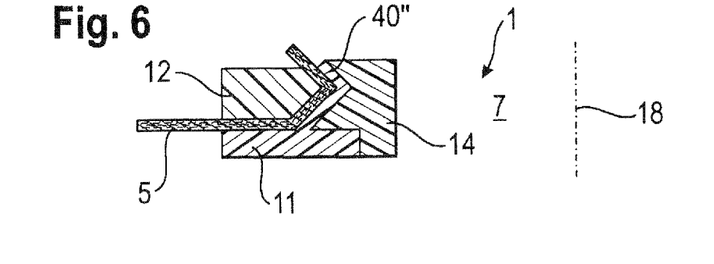
FIG. 6 shows a sectional partial view of the filter element according to an alternative embodiment of the present invention.

A profile element in the form of a bent profiled protrusion 40" is provided on the retainer base body 11 in the embodiment of FIG. 6. The filter medium 5 is guided along this profiled protrusion 40" and bent in order to produce a particularly solid connection between the retainer 1 and the filter medium 5. At the same time the profiled protrusion 40" forms a snap lock between the retainer base body 11 and the retainer attachment 12. In order to secure this snap lock, the retainer 1 comprises a further annular element 14 which is arranged on the side of the profiled protrusion 40" facing away from the retainer attachment 12.

Figure 8:
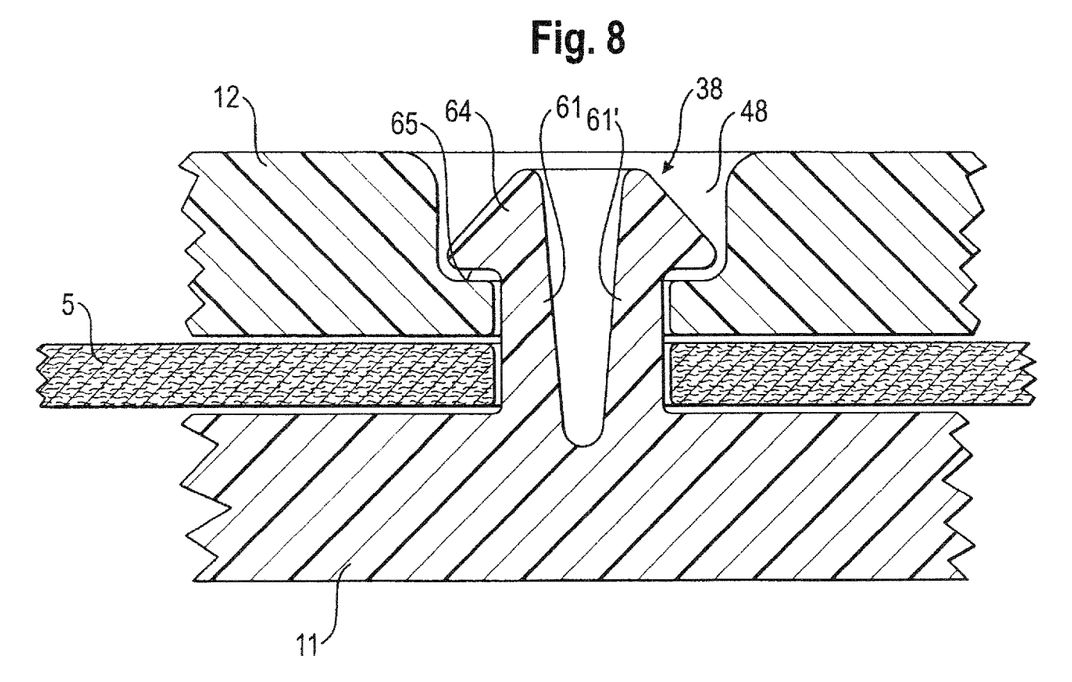
FIGS. 8 and 9 show sectional partial views of further embodiments of filter elements according to the invention.

A further embodiment of a filter element according to the present invention is shown in FIG. 8. In the embodiment of FIG. 8 a profile element in the form of a snap lock element 38 is provided on the retainer base body 11. This snap lock element 38 goes through a recess in the filter medium 5, whereby the filter medium 5 is held in a form-fitting connection, and engages in a further recess 48 in the retainer attachment 12.

The snap lock element 38 comprises two flexible legs 61, 61' which each have a hook element 64 at the head face. The hook elements 64 of the two legs 61, 61' hold the snap lock element 38 together with the retainer base body 11 in a form-fitting way on the retainer attachment 12. In particular the retainer attachment 12 comprises, in the region of the recess 38, an undercut 65, on which the hook elements 64 engage.

Figure 9:
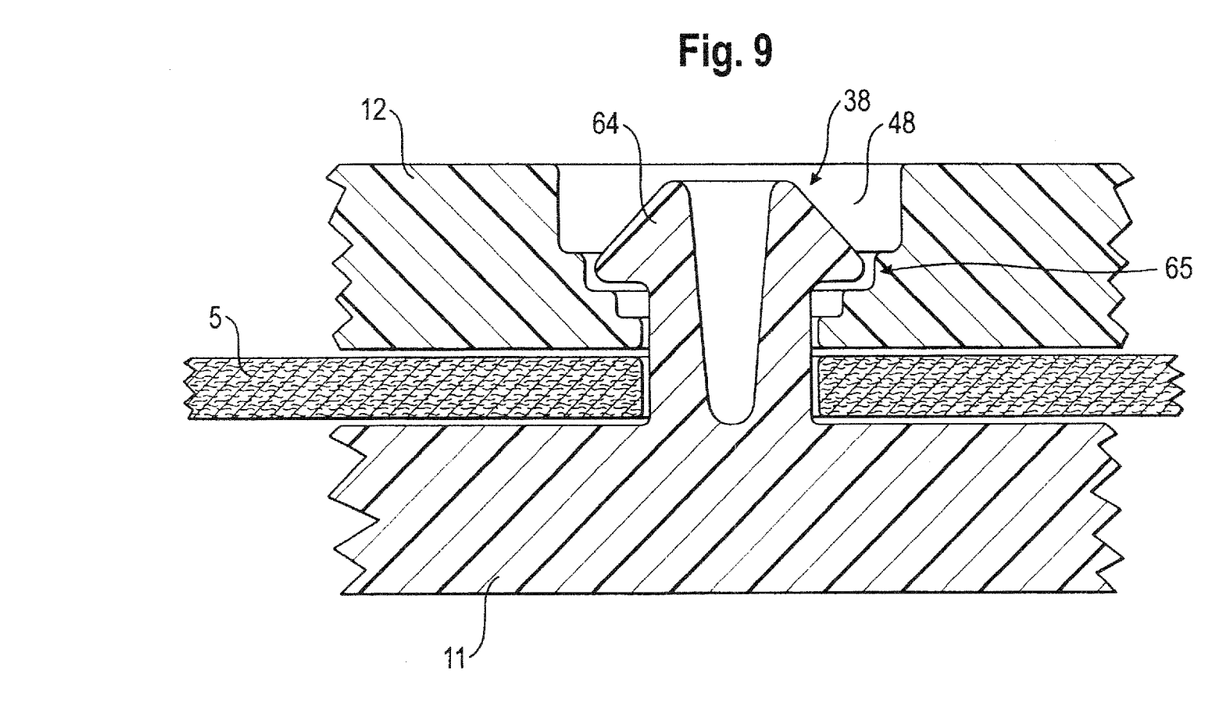

A further embodiment of a filter element according to the present invention is shown in FIG. 9. The embodiment of FIG. 9 allows the retainer base body 11 and the retainer attachment 12 to be locked to each other at differing distances from each other. The same retainer can thus be used for filter media 5 of differing thickness.

In order to allow the locking at varying distances, the undercut is formed in steps in the embodiment of FIG. 9, wherein the diameter of the recess 48 increases outwardly with increasing distance from the retainer base body 11. This results in the formation of several detent positions for the hook elements 64 of the snap lock element 38.

Figure 10:
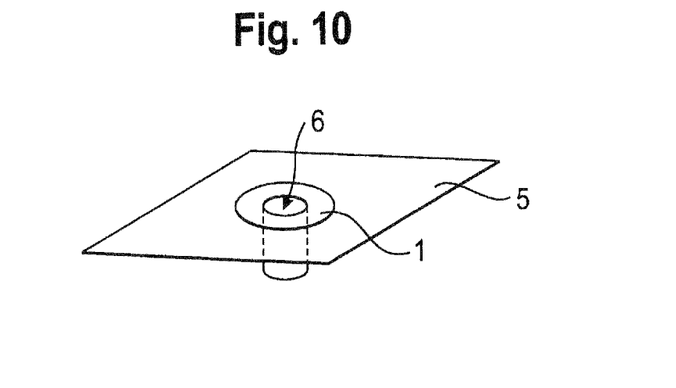
FIGS. 10 and 11 show perspective views of further embodiments of filter elements according to the invention illustrating the arrangement and configuration of the retainer.
Figure 11:
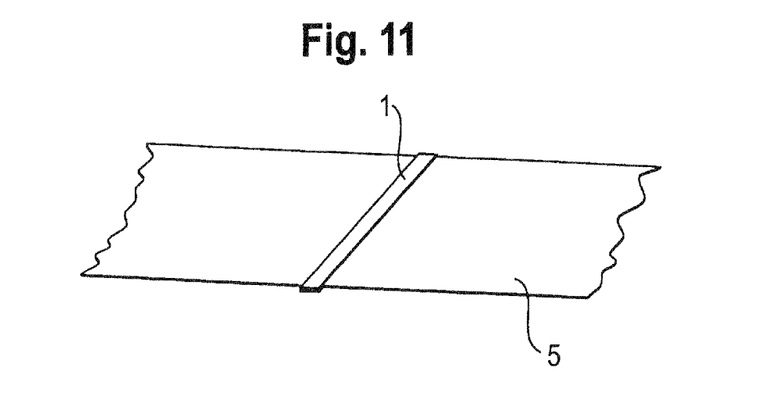

Further embodiments of filter elements according to the present invention are shown in FIGS. 10 and 11. In the embodiment of FIG. 10 the retainer 1 is in the form of a flange element which is arranged on the filter medium 5 in the region of a hole 6 incorporated in the filter medium 5. In particular the retainer 1 can hereby be formed as a pass-through fitting of a filter press plate.

In the embodiment of FIG. 11 the filter element 5 is formed as a filter band and the retainer 1 forms an elongated band locking element which connects adjacent ends of the filter medium 5. For this purpose the retainer 1 is elongated and formed at opposing front faces of the filter medium 5.

Although a limited number of embodiments are described herein, one of ordinary skill in the art will readily recognize that there could be variations to any of these embodiments and those variations would be within the scope of the appended claims. Thus, it will be apparent to those skilled in the art that various changes and modifications can be made to the filter element described herein without departing from the scope of the appended claims and their equivalents.

The invention claimed is:

1. Filter element, comprising:
    a filter medium,
    a retainer to which the filter medium is fixed,
    the retainer including a retainer base body and a retainer attachment, the filter is placed between the retainer base body and the retainer attachment both having a flat configuration in the entire region of the filter medium placed between them, and
a plurality of radial passage channels provided on the retainer base body extending radially from a center axis and configured for radial passage of liquid to be filtered,
wherein the filter medium is sandwiched between the retainer base body and the retainer attachment at least in sections, and
wherein at least one profile element is formed on the retainer base body and the retainer attachment for at least one of form-fitting and force-fitting retention of the filter medium, wherein the at least one profile element is formed as a retaining mandrel which penetrates the filter medium, and the at least one profile element comprises means for connecting the retainer base body to the retainer attachment,
wherein the retainer base body and the retainer attachment are at least one of welded and stuck together via the at least one profile element.

2. The filter element according to claim 1, wherein the at least one profile element is in the form of a profiled protrusion which protrudes on at least one of the retainer base body and the retainer attachment, and at least one of a corresponding recess and a corresponding counterpart is provided on at least one of the retainer attachment and the retainer base body, respectively, into which the at least one profile element engages.

3. The filter element according to claim 1, wherein the filter medium is bent at least once in the region of the retainer.

4. The filter element according to claim 1, wherein at least one of the retainer base body and the retainer attachment are formed annularly.

5. The filter element according to claim 1, wherein the filter medium is connected in a material-locking way, by being welded, to the retainer.

6. The filter element according to claim 1, wherein the filter element is formed as a filter press plate and the retainer is arranged on a filter passage tube.

7. The filter element according to claim 1, wherein the filter medium is provided with at least one hole and the filter medium is fixed in the region of the hole to the retainer.

8. The filter element according to claim 1, wherein the retainer extends along at least one edge of the filter medium.

9. The filter element according to claim 1, wherein the filter medium includes a filter fabric.

10. The filter element of claim 1, wherein the at least one profile element is formed as a plurality of retaining mandrels which each penetrating the filter medium.

11. The filter element of claim 10, wherein the plurality of retaining mandrels include a first plurality of retaining mandrels located at a first distance from a center axis and a second plurality of retaining mandrels located at a second distance from the axis point with the first distance greater than the second distance.

12. Method for filtering a liquid using a filter element, comprising
providing a filter medium,
providing a retainer to which the filter medium is fixed, the retainer comprising a retainer base body and a retainer attachment, the filter is placed between the retainer base body and the retainer attachment both having a flat configuration in the entire region of the filter medium placed between them, and a plurality of radial passage channels provided on the retainer base body extending radially from a center axis and configured for radial passage of liquid to be filtered,
arranging the filter medium between the retainer base body and the retainer attachment such that the filter medium is sandwiched between the retainer base body and the retainer attachment at least in sections, and
forming at least one profile element on at least one of the retainer base body and the retainer attachment for at least one of form-fitting and force-fitting retention of the filter medium, wherein the at least one profile element is formed as a retaining mandrel which penetrates the filter medium; bonding the retainer base body to the retainer attachment; and
passing the liquid through the filter medium of the filter element.

13. The method of claim 12, wherein the retaining mandrel, the retainer attachment are of a thermoplastic material, and wherein bonding the retaining mandrel of the retainer base body to the retainer attachment is performed by fusion bonding of the thermoplastic retaining mandrel and the thermoplastic retainer attachment.

14. The method of claim 12, wherein bonding the retaining mandrel of the retainer base body to the retainer attachment is performed by fusion bonding.

15. The method for filtering according to claim 12, wherein the filter medium includes a filter fabric.

16. A filter element, comprising:
a filter medium,
a retainer to which the filter medium is fixed,
the retainer including a retainer base body and a retainer attachment, the filter is placed between the retainer base body and the retainer attachment both having a flat configuration in the entire region of the filter medium placed between them, and
a plurality of radial passage channels provided on the retainer base body extending radially from a center axis and configured for radial passage of liquid to be filtered,
wherein the filter medium is arranged between the retainer base body and the retainer attachment such that the filter medium is sandwiched between the retainer base body and the retainer attachment at least in sections, and
wherein at least one profile element is formed on at least one of the retainer base body and the retainer attachment for at least one of form-fitting and force-fitting retention of the filter medium, wherein the at least one profile element is formed as a retaining mandrel which penetrates the filter medium,
wherein the at least one profile element includes a snap lock element to connect and secure the retainer base body to the retainer attachment, and the snap lock element includes a barb-like profiled protrusion which protrudes from at least one of the retainer base body and the retainer attachment, and
at the retainer attachment and the retainer base body respectively, at least one of a corresponding recess and a corresponding counterpart is provided, into which the snap lock element engages respectively.

17. The filter element according to claim 16, wherein the filter medium includes a filter fabric.

18. A filter element, comprising:
a filter medium, and
a retainer to which the filter medium is fixed,
the retainer including a retainer base body and a retainer attachment, the filter is placed between the retainer base body and the retainer attachment both having a flat configuration in the entire region of the filter medium placed between them, and a plurality of radial passage channels provided on the retainer base body extending radially from a center axis and configured for radial passage of liquid to be filtered,
wherein the filter medium is sandwiched between the retainer base body and the retainer attachment at least in sections, and
wherein at least one profile element is formed on at least one of the retainer base body and the retainer attachment for at least one of form-fitting and force-fitting retention of the filter medium, wherein the at least one profile element is formed as a retaining mandrel which penetrates the filter medium, and the at least one profile element is adapted to connect the retainer base body to the retainer attachment,
wherein the retainer base body and the attachment are fusion bonded and stuck together via the at least one profile element.

19. The filter element according to claim 18, wherein the filter medium includes a filter fabric.

* * * * *